(12) United States Patent
Zhu et al.

(10) Patent No.: US 10,476,746 B2
(45) Date of Patent: Nov. 12, 2019

(54) NETWORK MANAGEMENT METHOD, DEVICE, AND SYSTEM

(71) Applicant: Huawei Technologies Co., Ltd., Shenzhen (CN)

(72) Inventors: Ren Zhu, Shenzhen (CN); Wei Zhou, Shenzhen (CN)

(*) Notice: Subject to any disclaimer, the term of this patent is extended or adjusted under 35 U.S.C. 154(b) by 139 days.

(21) Appl. No.: 15/661,811

(22) Filed: Jul. 27, 2017

(65) Prior Publication Data

US 2017/0324619 A1 Nov. 9, 2017

Related U.S. Application Data

(63) Continuation of application No. PCT/CN2015/085589, filed on Jul. 30, 2015.

(30) Foreign Application Priority Data

Jan. 27, 2015 (CN) .......................... 2015 1 0039724

(51) Int. Cl.
*G06F 15/173* (2006.01)
*H04L 12/24* (2006.01)
*H04L 12/26* (2006.01)

(52) U.S. Cl.
CPC ...... *H04L 41/0896* (2013.01); *H04L 41/5019* (2013.01); *H04L 41/5025* (2013.01); *H04L 43/0882* (2013.01); *H04L 43/0894* (2013.01)

(58) Field of Classification Search
None
See application file for complete search history.

(56) References Cited

U.S. PATENT DOCUMENTS 7,154,852 B1 * 12/2006 Kalimuthu .......... H04L 12/5601
370/232
7,433,304 B1 * 10/2008 Galloway ............... H04L 47/10
370/229

(Continued)

FOREIGN PATENT DOCUMENTS

CN  1886933 A  12/2006
CN  101106501 A  1/2008

(Continued)

OTHER PUBLICATIONS

Machine Translation and Abstract of Chinese Publication No. CN101106501, Jan. 16, 2008, 8 pages.

(Continued)

*Primary Examiner* — Phyllis A Book
(74) *Attorney, Agent, or Firm* — Conley Rose, P.C.

(57) ABSTRACT

A network management method, device, and system used for network management and pertains to the communications field, where the method includes detecting bandwidth required by a first data flow, determining whether the bandwidth required by the first data flow is greater than a preset bandwidth value when the bandwidth required by the first data flow becomes higher, and allocating bandwidth to the first data flow when the bandwidth required by the first data flow is greater than the preset bandwidth value. Hence, a problem that a controller has relatively low efficiency when performing network management is resolved, thereby improving efficiency of performing network management by the controller.

18 Claims, 12 Drawing Sheets

(56) References Cited

U.S. PATENT DOCUMENTS

| | | | | |
|---|---|---|---|---|
| 2008/0298391 | A1* | 12/2008 | Feroz | H04L 47/10 370/468 |
| 2014/0169788 | A1* | 6/2014 | Hussain | H04L 12/00 398/43 |
| 2014/0189158 | A1* | 7/2014 | You | H04L 47/722 709/238 |
| 2014/0269319 | A1* | 9/2014 | DeCusatis | H04L 47/12 370/236 |
| 2015/0138986 | A1* | 5/2015 | Gale | H04L 47/125 370/237 |

FOREIGN PATENT DOCUMENTS

| | | |
|---|---|---|
| CN | 102394822 A | 3/2012 |
| CN | 102710489 A | 10/2012 |
| CN | 103023812 A | 4/2013 |
| CN | 104618157 A | 5/2015 |

OTHER PUBLICATIONS

Machine Translation and Abstract of Chinese Publication No. CN102394822, Mar. 28, 2012, 8 pages.
Machine Translation and Abstract of Chinese Publication No. CN102710489, Oct. 3, 2012, 24 pages.
Machine Translation and Abstract of Chinese Publication No. CN103023812, Apr. 3, 2013, 5 pages.
Machine Translation and Abstract of Chinese Publication No. CN104618157, May 13, 2015, 26 pages.
Egilmez, E., et al., "OpenQoS: An OpenFlow Controller Design for Multimedia Delivery with End-to-End Quality of Service over Software-Defined Networks," Dec. 2012, 8 pages.
Ying-Zhuang, L., et al., "Design and Implementation of QoS Management System Based on OpenFlow," Journal of Guangxi University, vol. 36, Sup. 1, Oct. 2011, 5 pages.
English Translation of Ying-Zhuang, L., et al., "Design and Implementation of QoS Management System Based on OpenFlow," Journal of Guangxi University, vol. 36, Sup. 1, Oct. 2011, 8 pages.
Foreign Communication From a Counterpart Application, Chinese Application No. 201510039724.1, Chinese Office Action dated Jul. 19, 2017, 6 pages.
Foreign Communication From a Counterpart Application, PCT Application No. PCT/CN2015/085589, English Translation of International Search Report dated Nov. 3, 2015, 2 pages.
Foreign Communication From a Counterpart Application, PCT Application No. PCT/CN2015/085589, English Translation of Written Opinion dated Nov. 3, 2015, 6 pages.

* cited by examiner

NETWORK MANAGEMENT METHOD, DEVICE, AND SYSTEM

CROSS-REFERENCE TO RELATED APPLICATIONS

This application is a continuation of International Patent Application No. PCT/CN2015/085589 filed on Jul. 30, 2015, which claims priority to Chinese Patent Application No. 201510039724.1 filed on Jan. 27, 2015. The disclosures of the aforementioned applications are hereby incorporated by reference in their entireties.

TECHNICAL FIELD

The present disclosure relates to the communications field, and in particular, to a network management method, device, and system.

BACKGROUND

With development of the Internet, people have an increasingly high requirement on network quality of service (QoS). However, workload on a router is relatively heavy because of enormous networks, diverse routing tables, and complex control algorithms, and consequently, network crashes frequently occur.

As the OPENFLOW develops, an OPENFLOW-based QoS management system is proposed. The QoS management system includes a controller, a primary switch, and multiple ingress switches. There are multiple data flows on the multiple ingress switches. Further, the controller first constructs, according to QoS configuration information, a flow table including QoS information, constructs a bandwidth turnover information base (also referred to as a lent and borrowed bandwidth information base) of all data flows, and constructs a bandwidth sharing relationship. Then the controller sends the constructed flow table including the QoS information to switches corresponding to all the data flows, queries bandwidth occupied by each data flow, and generates, according to a flow table of all the data flows and the bandwidth occupied by each data flow, a lendable bandwidth information base corresponding to all the data flows. When receiving a data flow forwarded by an ingress switch, the primary switch queries bandwidth of the data flow. The primary switch forwards the data flow if the bandwidth of the data flow is greater than or equal to bandwidth required by the data flow, or the primary switch needs to detect whether a bandwidth borrowing failure flag is set on the data flow if the bandwidth of the data flow is less than bandwidth required by the data flow. The primary switch performs packet discarding processing on the data flow if the primary switch detects that a bandwidth borrowing failure flag is set on the data flow, or the primary switch generates a bandwidth request message according to the bandwidth required by the data flow, and sends the bandwidth request message to the controller if the primary switch detects that no bandwidth borrowing failure flag is set on the data flow, and the controller allocates bandwidth to the data flow according to the bandwidth request message.

When the bandwidth of the data flow is less than the bandwidth required by the data flow, the primary switch needs to send the bandwidth request message to the controller in order to trigger the controller to allocate bandwidth to the data flow. Because a time period from a moment at which it is determined that the bandwidth of the data flow is less than the bandwidth required by the data flow to a moment at which the controller allocates bandwidth to the data flow is relatively long, the controller has relatively low efficiency when performing network management.

SUMMARY

To resolve a problem that a controller has relatively low efficiency when performing network management, the present disclosure provides a network management method, device, and system. The technical solutions are as follows.

According to a first aspect, a network management method is provided, where the network management method is applied to a controller in a network management system. The network management system includes the controller and multiple switches, where the multiple switches include a primary switch and multiple ingress switches, and there are multiple data flows on the multiple ingress switches, and the network management method includes detecting bandwidth required by a first data flow, where the first data flow is any one of the multiple data flows, determining whether the bandwidth required by the first data flow is greater than a preset bandwidth value when the bandwidth required by the first data flow becomes higher, and allocating bandwidth to the first data flow if the bandwidth required by the first data flow is greater than the preset bandwidth value.

With reference to the first aspect, in a first possible implementation, before the detecting bandwidth required by a first data flow, the network management method further includes obtaining network QoS configuration information in the network management system, separately generating a shared bandwidth information tree, a bandwidth turnover information base, a flow table corresponding to each of the multiple data flows, and a correspondence between each of the multiple data flows and an ingress switch according to the QoS configuration information, where the shared bandwidth information tree records bandwidth corresponding to each of the multiple data flows, the bandwidth turnover information base records lent bandwidth corresponding to each of the multiple data flows and an identifier of a lending data flow, and borrowed bandwidth corresponding to each of the multiple data flows and an identifier of a borrowing data flow, and the flow table is used to indicate maximum bandwidth occupied by each of the multiple data flows, obtaining bandwidth occupied by each of the multiple data flows, determining, according to the bandwidth occupied by each of the multiple data flows and the flow table corresponding to each of the multiple data flows, lendable bandwidth corresponding to each of the multiple data flows, and generating a lendable bandwidth information base according to the lendable bandwidth corresponding to each of the multiple data flows, where the lendable bandwidth information base records the lendable bandwidth corresponding to each of the multiple data flows.

With reference to the first possible implementation, in a second possible implementation, allocating bandwidth to the first data flow includes obtaining, from the bandwidth turnover information base, lent bandwidth corresponding to the first data flow, determining whether there is lent bandwidth on the first data flow according to the lent bandwidth corresponding to the first data flow, and allocating bandwidth to the first data flow according to a determining result of the lent bandwidth.

With reference to the second possible implementation, in a third possible implementation, allocating bandwidth to the first data flow according to a determining result of the lent bandwidth includes obtaining, from the bandwidth turnover information base, an identifier of a lending data flow corresponding to the first data flow if there is lent bandwidth on the first data flow, obtaining, according to the correspondence between each of the multiple data flows and an ingress switch, an identifier of an ingress switch corresponding to the lending data flow, generating a first packet discard message according to the lent bandwidth corresponding to the first data flow, sending, according to the identifier of the ingress switch corresponding to the lending data flow, the first packet discard message to the ingress switch corresponding to the lending data flow such that the ingress switch corresponding to the lending data flow performs packet discarding according to the first packet discard message, and allocating the lent bandwidth to the first data flow.

With reference to the second possible implementation, in a fourth possible implementation, allocating bandwidth to the first data flow according to a determining result of the lent bandwidth includes obtaining, from the lendable bandwidth information base, the lendable bandwidth corresponding to each of the multiple data flows if there is no lent bandwidth on the first data flow, determining, according to lendable bandwidth corresponding to other data flows other than the first data flow in the multiple data flows, whether there is lendable bandwidth on the other data flows, and allocating bandwidth to the first data flow according to a determining result of the lendable bandwidth.

With reference to the fourth possible implementation, in a fifth possible implementation, allocating bandwidth to the first data flow according to a determining result of the lendable bandwidth includes selecting, from the other data flows and according to the bandwidth required by the first data flow and the lendable bandwidth corresponding to the other data flows, a data flow whose corresponding lendable bandwidth is greater than zero as a second data flow if there is lendable bandwidth on the other data flows, and allocating the lendable bandwidth corresponding to the second data flow to the first data flow.

With reference to the fourth possible implementation, in a sixth possible implementation, allocating bandwidth to the first data flow according to a determining result of the lendable bandwidth includes obtaining priorities of all of the multiple data flows if there is no lendable bandwidth on the other data flows, obtaining, from the shared bandwidth information tree, bandwidth corresponding to the other data flows, selecting, from the other data flows and according to a priority of the first data flow, priorities of the other data flows, the bandwidth corresponding to the other data flows, and bandwidth required by a data flow on a first ingress switch, a data flow whose priority is lower than the priority of the first data flow as a third data flow, obtaining, according to the correspondence between each of the multiple data flows and an ingress switch, an identifier of an ingress switch corresponding to the third data flow, generating second packet discard message according to bandwidth corresponding to the third data flow, sending, according to the identifier of the ingress switch corresponding to the third data flow, the second packet discard message to the ingress switch corresponding to the third data flow such that the ingress switch corresponding to the third data flow performs packet discarding according to the second packet discard message, and allocating bandwidth corresponding to the third data flow to the first data flow.

According to a second aspect, a network management device is provided, where the network management device is a controller, and the network management device includes a detection unit configured to detect bandwidth required by a first data flow, where the first data flow is any one of the multiple data flows, a judging unit configured to determine whether the bandwidth required by the first data flow is greater than a preset bandwidth value when the bandwidth required by the first data flow becomes higher, and an allocation unit configured to allocate bandwidth to the first data flow if the bandwidth required by the first data flow is greater than the preset bandwidth value.

With reference to the second aspect, in a first possible implementation, the network management device further includes a first obtaining unit configured to obtain network QoS configuration information in the network management system, a first generation unit configured to separately generate a shared bandwidth information tree, a bandwidth turnover information base, a flow table corresponding to each of the multiple data flows, and a correspondence between each of the multiple data flows and an ingress switch according to the QoS configuration information, where the shared bandwidth information tree records bandwidth corresponding to each of the multiple data flows, the bandwidth turnover information base records lent bandwidth corresponding to each of the multiple data flows and an identifier of a lending data flow, and borrowed bandwidth corresponding to each of the multiple data flows and an identifier of a borrowing data flow, and the flow table is used to indicate maximum bandwidth occupied by each of the multiple data flows, a second obtaining unit configured to obtain bandwidth occupied by each of the multiple data flows, a determining unit configured to determine, according to the bandwidth occupied by each of the multiple data flows and the flow table corresponding to each of the multiple data flows, lendable bandwidth corresponding to each of the multiple data flows, and a second generation unit configured to generate a lendable bandwidth information base according to the lendable bandwidth corresponding to each of the multiple data flows, where the lendable bandwidth information base records the lendable bandwidth corresponding to each of the multiple data flows.

With reference to the first possible implementation, in a second possible implementation, the allocation unit includes an obtaining module configured to obtain, from the bandwidth turnover information base, lent bandwidth corresponding to the first data flow, a determining module configured to determine whether there is lent bandwidth on the first data flow according to the lent bandwidth corresponding to the first data flow, and an allocation module configured to allocate bandwidth to the first data flow according to a determining result of the lent bandwidth.

With reference to the second possible implementation, in a third possible implementation, the allocation module includes a first obtaining submodule configured to obtain, from the bandwidth turnover information base, an identifier of a lending data flow corresponding to the first data flow if there is lent bandwidth on the first data flow, a second obtaining submodule configured to obtain, according to the correspondence between each of the multiple data flows and an ingress switch, an identifier of an ingress switch corresponding to the lending data flow, a generation submodule configured to generate a first packet discard message according to the lent bandwidth corresponding to the first data flow, a sending submodule configured to send, according to the identifier of the ingress switch corresponding to the lending data flow, the first packet discard message to the ingress switch corresponding to the lending data flow such that the ingress switch corresponding to the lending data flow performs packet discarding according to the first packet discard message, and a first allocation submodule configured to allocate the lent bandwidth to the first data flow.

With reference to the second possible implementation, in a fourth possible implementation, the allocation module includes a third obtaining submodule configured to obtain, from the lendable bandwidth information base, the lendable bandwidth corresponding to each of the multiple data flows if there is no lent bandwidth on the first data flow, a determining submodule configured to determine, according to lendable bandwidth corresponding to other data flows other than the first data flow in the multiple data flows, whether there is lendable bandwidth on the other data flows, and a second allocation submodule configured to allocate bandwidth to the first data flow according to a determining result of the lendable bandwidth.

With reference to the fourth possible implementation, in a fifth possible implementation, the second allocation submodule is further configured to select, from the other data flows and according to the bandwidth required by the first data flow and the lendable bandwidth corresponding to the other data flows, a data flow whose corresponding lendable bandwidth is greater than zero as a second data flow if there is lendable bandwidth on the other data flows, and allocate the lendable bandwidth corresponding to the second data flow to the first data flow.

With reference to the fourth possible implementation, in a sixth possible implementation, the second allocation submodule is further configured to obtain priorities of all of the multiple data flows if there is no lendable bandwidth on the other data flows, obtain, from the shared bandwidth information tree, bandwidth corresponding to the other data flows, select, from the other data flows and according to a priority of the first data flow, priorities of the other data flows, the bandwidth corresponding to the other data flows, and bandwidth required by a data flow on a first ingress switch, a data flow whose priority is lower than the priority of the first data flow as a third data flow, obtain, according to the correspondence between each of the multiple data flows and an ingress switch, an identifier of an ingress switch corresponding to the third data flow, generate second packet discard message according to bandwidth corresponding to the third data flow, send, according to the identifier of the ingress switch corresponding to the third data flow, the second packet discard message to the ingress switch corresponding to the third data flow such that the ingress switch corresponding to the third data flow performs packet discarding according to the second packet discard message, and allocate bandwidth corresponding to the third data flow to the first data flow.

According to a third aspect, a network management system is provided, where the network management system includes any one of the foregoing network management devices.

According to the network management method, device, and system that are provided in the present disclosure, a controller detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
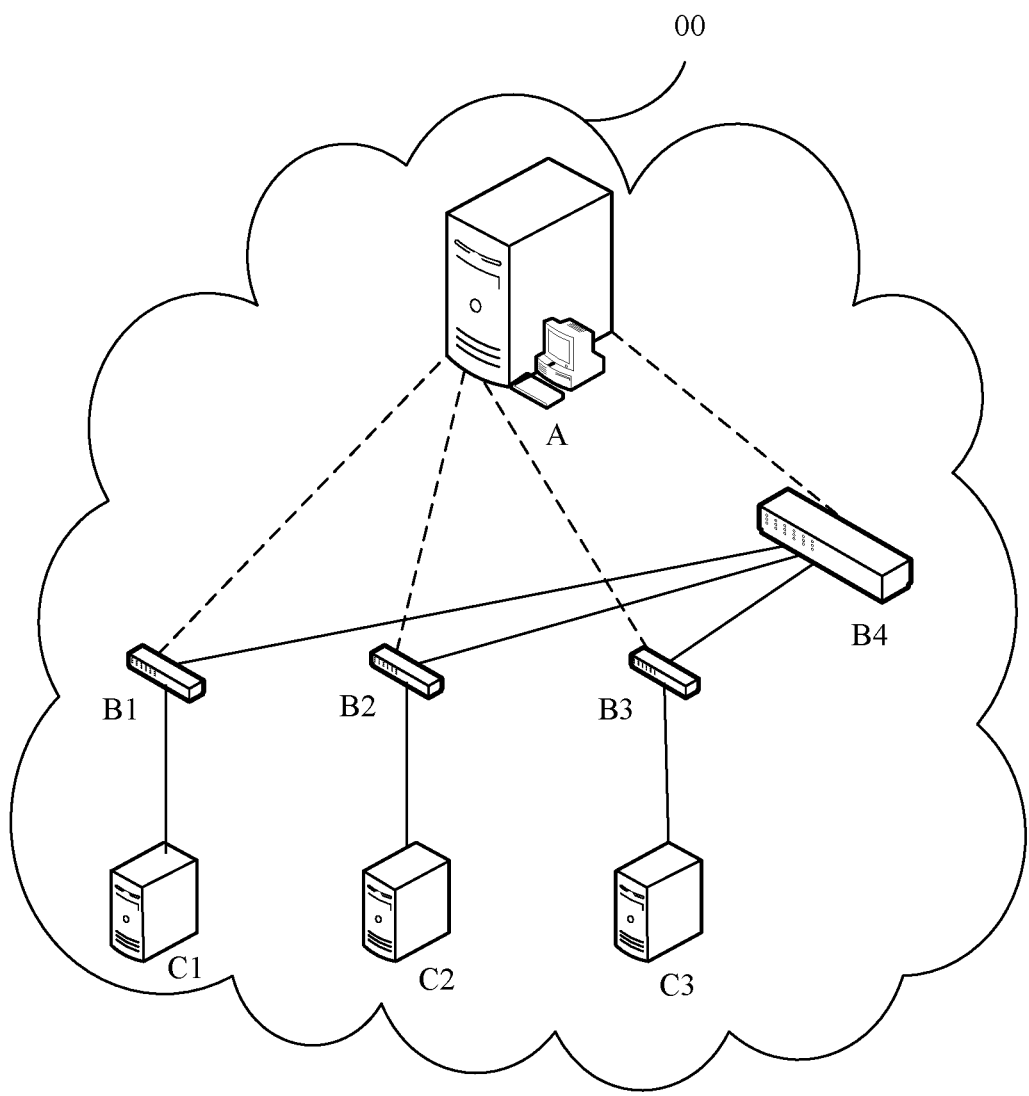
FIG. 1 is a schematic diagram of an architecture of a network management system according to an embodiment of the present disclosure.

FIG. 1 is a network management system 00 provided in an embodiment of the present disclosure. The network management system 00 may include a controller A and multiple switches. The multiple switches may include a primary switch B4, an ingress switch B1, an ingress switch B2, and an ingress switch B3. Multiple clients may include a client C1, a client C2, and a client C3. The client C1 is connected to the ingress switch B1, the client C2 is connected to the ingress switch B2, the client C3 is connected to the ingress switch B3, and the ingress switch B1, the ingress switch B2, and the ingress switch B3 are separately connected to the primary switch B4. The controller A can communicate with the multiple switches. Each client C1, C2, and C3 can generate a data flow, an ingress switch connected to the client forwards the data flow to the primary switch B4, and the primary switch B4 performs corresponding processing on the data flow. There may be multiple data flows on the multiple ingress switches. Particularly, an example in which the network management system 00 includes one primary switch and three ingress switches is used in FIG. 1 for description. In actual application, neither a quantity of primary switches nor a quantity of ingress switches is limited.

Figure 2:
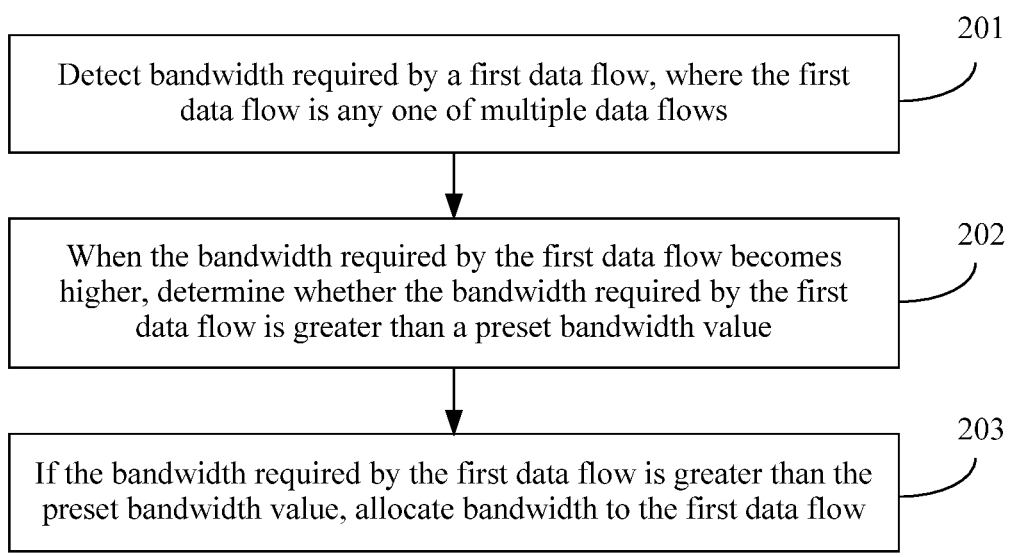
FIG. 2 is a flowchart of a network management method according to an embodiment of the present disclosure.

As shown in FIG. 2, FIG. 2 is a network management method provided in an embodiment of the present disclosure. The network management method is applied to a controller A in a network management system 00 in FIG. 1. The network management system may include a controller and multiple switches, the multiple switches may include a primary switch and multiple ingress switches, and there may be multiple data flows on the multiple ingress switches. The network management method may include the following steps.

Step 201: Detect bandwidth required by a first data flow, where the first data flow is any one of multiple data flows.

Step 202: When the bandwidth required by the first data flow becomes higher, determine whether the bandwidth required by the first data flow is greater than a preset bandwidth value.

Step 203: If the bandwidth required by the first data flow is greater than the preset bandwidth value, allocate bandwidth to the first data flow.

In conclusion, according to the network management method provided in this embodiment of the present disclosure, a controller detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Further, before step 201, the network management method may include obtaining network QoS configuration information in the network management system, and separately generating a shared bandwidth information tree, a bandwidth turnover information base, a flow table corresponding to each of the multiple data flows, and a correspondence between each of the multiple data flows and an ingress switch according to the QoS configuration information, where the shared bandwidth information tree records bandwidth corresponding to each of the multiple data flows, the bandwidth turnover information base records lent bandwidth corresponding to each of the multiple data flows and an identifier of a lending data flow, and borrowed bandwidth corresponding to each of the multiple data flows and an identifier of a borrowing data flow, and the flow table is used to indicate maximum bandwidth occupied by each of the multiple data flows, and obtaining bandwidth occupied by each of the multiple data flows, determining, according to the bandwidth occupied by each of the multiple data flows and the flow table corresponding to each of the multiple data flows, lendable bandwidth corresponding to each of the multiple data flows, and generating a lendable bandwidth information base according to the lendable bandwidth corresponding to each of the multiple data flows, where the lendable bandwidth information base records the lendable bandwidth corresponding to each of the multiple data flows.

Further, step 203 may include obtaining, from the bandwidth turnover information base, lent bandwidth corresponding to the first data flow, determining whether there is lent bandwidth on the first data flow according to the lent bandwidth corresponding to the first data flow, and allocating bandwidth to the first data flow according to a determining result of the lent bandwidth.

For example, allocating bandwidth to the first data flow according to a determining result of the lent bandwidth may include obtaining, from the bandwidth turnover information base, an identifier of a lending data flow corresponding to the first data flow if there is lent bandwidth on the first data flow, obtaining, according to the correspondence between each of the multiple data flows and an ingress switch, an identifier of an ingress switch corresponding to the lending data flow, generating a first packet discard message according to the lent bandwidth corresponding to the first data flow, sending, according to the identifier of the ingress switch corresponding to the lending data flow, the first packet discard message to the ingress switch corresponding to the lending data flow such that the ingress switch corresponding to the lending data flow performs packet discarding according to the first packet discard message, and allocating the lent bandwidth to the first data flow.

Optionally, allocating bandwidth to the first data flow according to a determining result of the lent bandwidth may include obtaining, from the lendable bandwidth information base, the lendable bandwidth corresponding to each of the multiple data flows if there is no lent bandwidth on the first data flow, determining, according to lendable bandwidth corresponding to other data flows other than the first data flow in the multiple data flows, whether there is lendable bandwidth on the other data flows, and allocating bandwidth to the first data flow according to a determining result of the lendable bandwidth.

Further, allocating bandwidth to the first data flow according to a determining result of the lendable bandwidth may include selecting, from the other data flows and according to the bandwidth required by the first data flow and the lendable bandwidth corresponding to the other data flows, a data flow whose corresponding lendable bandwidth is greater than zero as a second data flow if there is lendable bandwidth on the other data flows, and allocating the lendable bandwidth corresponding to the second data flow to the first data flow.

For example, allocating bandwidth to the first data flow according to a determining result of the lendable bandwidth may include obtaining priorities of all of the multiple data flows if there is no lendable bandwidth on the other data flows, obtaining, from the shared bandwidth information tree, bandwidth corresponding to the other data flows, selecting, from the other data flows and according to a priority of the first data flow, priorities of the other data flows, the bandwidth corresponding to the other data flows, and bandwidth required by a data flow on the first ingress switch, a data flow whose priority is lower than the priority of the first data flow as a third data flow, obtaining, according to the correspondence between each of the multiple data flows and an ingress switch, an identifier of an ingress switch corresponding to the third data flow, generating second packet discard message according to bandwidth corresponding to the third data flow, sending, according to the identifier of the ingress switch corresponding to the third data flow, the second packet discard message to the ingress switch corresponding to the third data flow such that the ingress switch corresponding to the third data flow performs packet discarding according to the second packet discard message, and allocating bandwidth corresponding to the third data flow to the first data flow.

In conclusion, according to the network management method provided in this embodiment of the present disclosure, a controller detects bandwidth required by a first data flow, determines whether the bandwidth required by the first data flow is greater than a preset bandwidth value, and when the bandwidth required by the first data flow is greater than the preset bandwidth value, allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 3:
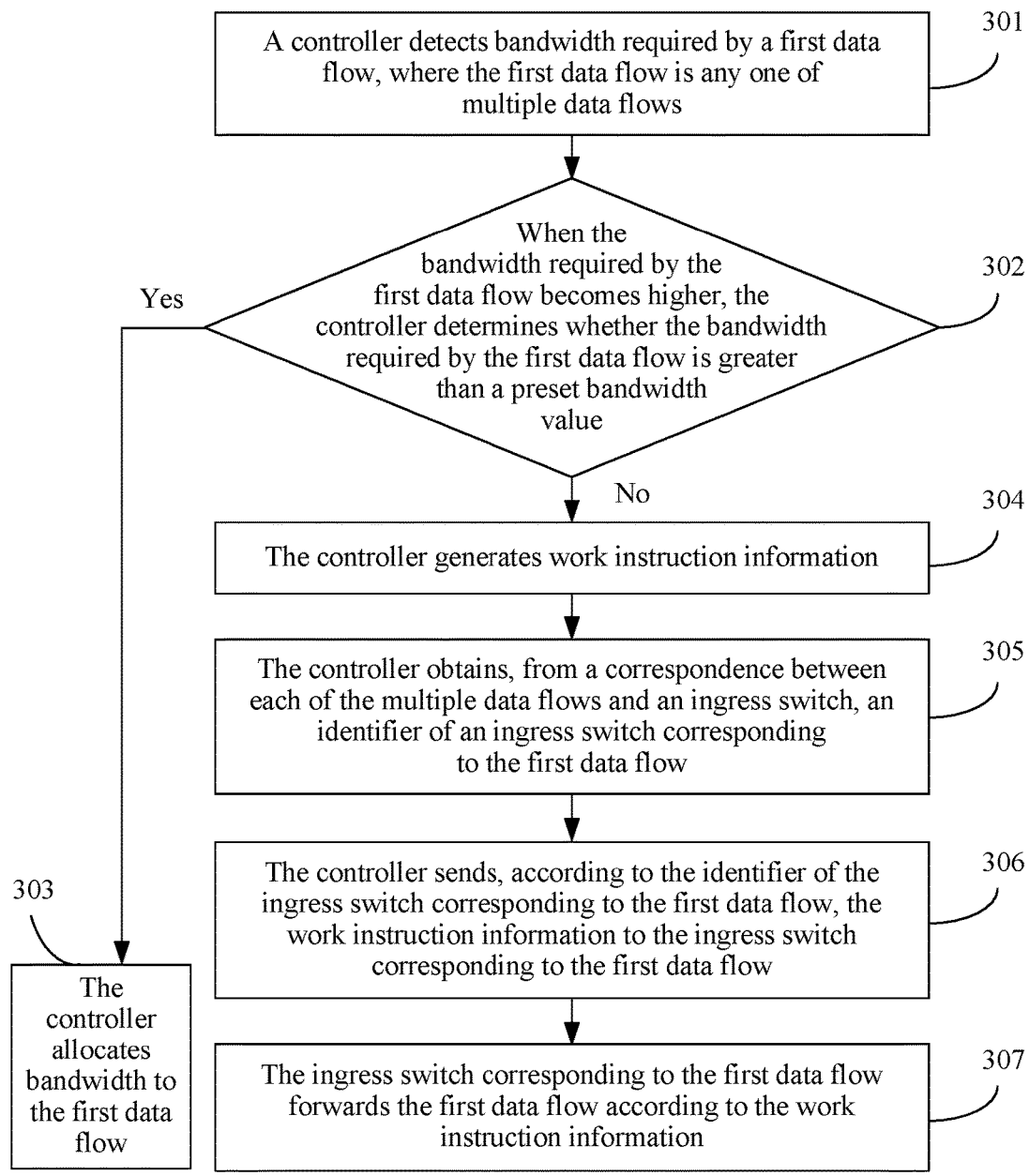
FIG. 3 is a flowchart of another network management method according to an embodiment of the present disclosure.

As shown in FIG. 3, an embodiment of the present disclosure provides another network management method. The network management method may be applied to a network management system 00 in FIG. 1. The network management method may include the following steps.

Step 301: A controller detects bandwidth required by a first data flow, where the first data flow is any one of multiple data flows.

For example, the controller may generate bandwidth detection information, obtain, from a correspondence that is between each of the multiple data flows and an ingress switch and that is stored in the controller, an identifier of an ingress switch corresponding to the first data flow, and send, according to the identifier of the ingress switch corresponding to the first data flow, the bandwidth detection information to the ingress switch corresponding to the first data flow. After receiving the bandwidth detection information, the ingress switch corresponding to the first data flow may generate a data flow bandwidth occupation message, and send the data flow bandwidth occupation message and an identifier of the first data flow to the controller. It should be noted that the data flow bandwidth occupation message may record the bandwidth required by the first data flow.

Step 302: When the bandwidth required by the first data flow becomes higher, the controller determines whether the bandwidth required by the first data flow is greater than a preset bandwidth value. If the bandwidth required by the first data flow is greater than the preset bandwidth value, perform step 303, or if the bandwidth required by the first data flow is not greater than the preset bandwidth value, perform step 304.

Further, when detecting that the bandwidth required by the first data flow becomes higher, the controller needs to determine whether the bandwidth that is required by the first data flow and that is detected in step 301 is greater than the preset bandwidth value. For example, the preset bandwidth value may be idle bandwidth on the first data flow. It should be noted that alternatively, the preset bandwidth value may be another value. This is not limited in this embodiment of the present disclosure. Optionally, when the controller detects that the bandwidth required by the first data flow becomes lower or remains unchanged, the controller may perform step 304, that is, generate work instruction information used to instruct the ingress switch corresponding to the first data flow to forward the first data flow, and send the work instruction information to the ingress switch corresponding to the first data flow, and the ingress switch corresponding to the first data flow forwards the first data flow according to the work instruction information.

Step 303: The controller allocates bandwidth to the first data flow.

For example, before step 301, the controller may generate a shared bandwidth information tree, a bandwidth turnover information base, a lendable bandwidth information base, a flow table corresponding to each of the multiple data flows, and a correspondence between each of the multiple data flows and an ingress switch. The controller may allocate bandwidth to the first data flow according to the shared bandwidth information tree, the bandwidth turnover information base, the flow table corresponding to each of the multiple data flows, and the lendable bandwidth information base.

A process in which the controller generates the shared bandwidth information tree, the bandwidth turnover information base, the flow table corresponding to each of the multiple data flows, and the correspondence between each of the multiple data flows and an ingress switch may be as follows. The controller may obtain QoS configuration information in the network management system, and separately generate, according to the QoS configuration information, the shared bandwidth information tree, the bandwidth turnover information base, the flow table corresponding to each of the multiple data flows, and the correspondence between each of the multiple data flows and an ingress switch.

Further, the QoS configuration information may include identifiers of a primary switch and multiple ingress switches, an identifier of each data flow, bandwidth provided for each data flow, and information about lent and borrowed bandwidth on each of the multiple data flows. The controller may generate the shared bandwidth information tree and the flow table according to the identifier of each of the multiple data flows and the bandwidth provided for each of the multiple data flows. The shared bandwidth information tree records bandwidth corresponding to each of the multiple data flows. The flow table is used to indicate maximum bandwidth occupied by each of the multiple data flows. The controller may further generate the bandwidth turnover information base according to the information about the lent and borrowed bandwidth on each of the multiple data flows and the identifier of each of the multiple data flows. The bandwidth turnover information base records the lent bandwidth corresponding to each of the multiple data flows and an identifier of a lending data flow, and borrowed bandwidth corresponding to each of the multiple data flows and an identifier of a borrowed data flow. It should be noted that the controller may further send the flow table corresponding to each of the multiple data flows and that is generated by the controller to switches corresponding to each of the multiple data flows, and a switch that receives the flow table may forward a data flow when bandwidth required by the data flow on the switch is less than or equal to maximum bandwidth that is occupied by the data flow and that is indicated by the flow table.

A process in which the controller generates the lendable bandwidth information base may be as follows. The controller obtains bandwidth occupied by each of the multiple data flows, and generates the lendable bandwidth information base according to the bandwidth occupied by each of the multiple data flows and the flow table corresponding to each of the multiple data flows.

Further, for a method for obtaining, by the controller, the bandwidth occupied by each of the multiple data flows, refer to the method in step 301 in FIG. 3 for detecting, by the controller, the bandwidth required by the first data flow. Details are not described in this embodiment of the present disclosure. The controller may subtract the bandwidth occupied by each of the multiple data flows from the maximum bandwidth that is occupied by each of the multiple data flows and that is indicated by the flow table corresponding to each of the multiple data flows in order to obtain the lendable bandwidth corresponding to each of the multiple data flows, and generate the lendable bandwidth information base according to the lendable bandwidth corresponding to each of the multiple data flows and the identifier of each of the multiple data flows, where the lendable bandwidth information base records the lendable bandwidth corresponding to each of the multiple data flows.

For example, when maximum bandwidth that is indicated by a flow table corresponding to a data flow on an ingress switch B1 and that is occupied by the data flow is 20 megabits per second (Mbps), and it is learned, by means of statistics collection, that bandwidth occupied by the data flow is 10 Mbps, the bandwidth 10 Mbps occupied by the data flow is subtracted from the maximum bandwidth 20 Mbps occupied by the data flow, and therefore, it is learned that lendable bandwidth of the data flow is 10 Mbps.

Figure 4:
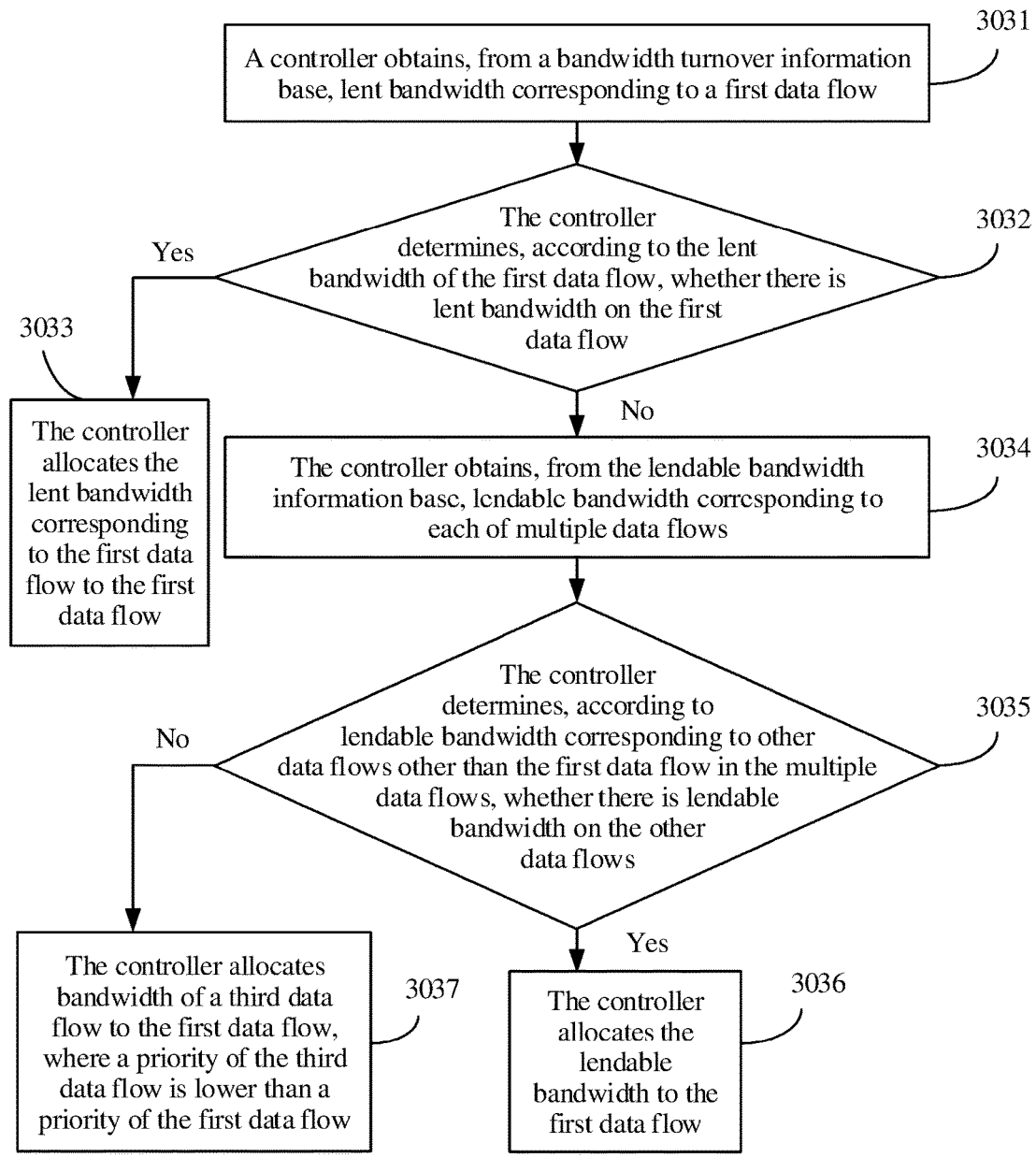
FIG. 4 is a flowchart of a bandwidth allocation method according to an embodiment of the present disclosure.

Correspondingly, as shown in FIG. 4, step 303 may include the following steps.

Step 3031: The controller obtains, from a bandwidth turnover information base, lent bandwidth corresponding to the first data flow.

The controller may obtain, from the bandwidth turnover information base established in step 302 and according to the identifier of the first data flow, the lent bandwidth corresponding to the first data flow.

Step 3032: The controller determines, according to the lent bandwidth of the first data flow, whether there is lent bandwidth on the first data flow. If there is lent bandwidth on the first data flow, perform step 3033, or if there is no lent bandwidth on the first data flow, perform step 3034.

The controller may determine whether the lent bandwidth corresponding to the first data flow and that is obtained in step 3031 is greater than zero in order to determine whether there is lent bandwidth on the first data flow. If the lent bandwidth corresponding to the first data flow is greater than zero, the controller determines that there is lent bandwidth on the first data flow, and performs step 3033, or if the lent bandwidth corresponding to the first data flow is not greater than zero, the controller determines that there is no lent bandwidth on the first data flow, and performs step 3034.

Step 3033: The controller allocates the lent bandwidth corresponding to the first data flow to the first data flow.

Figure 5:
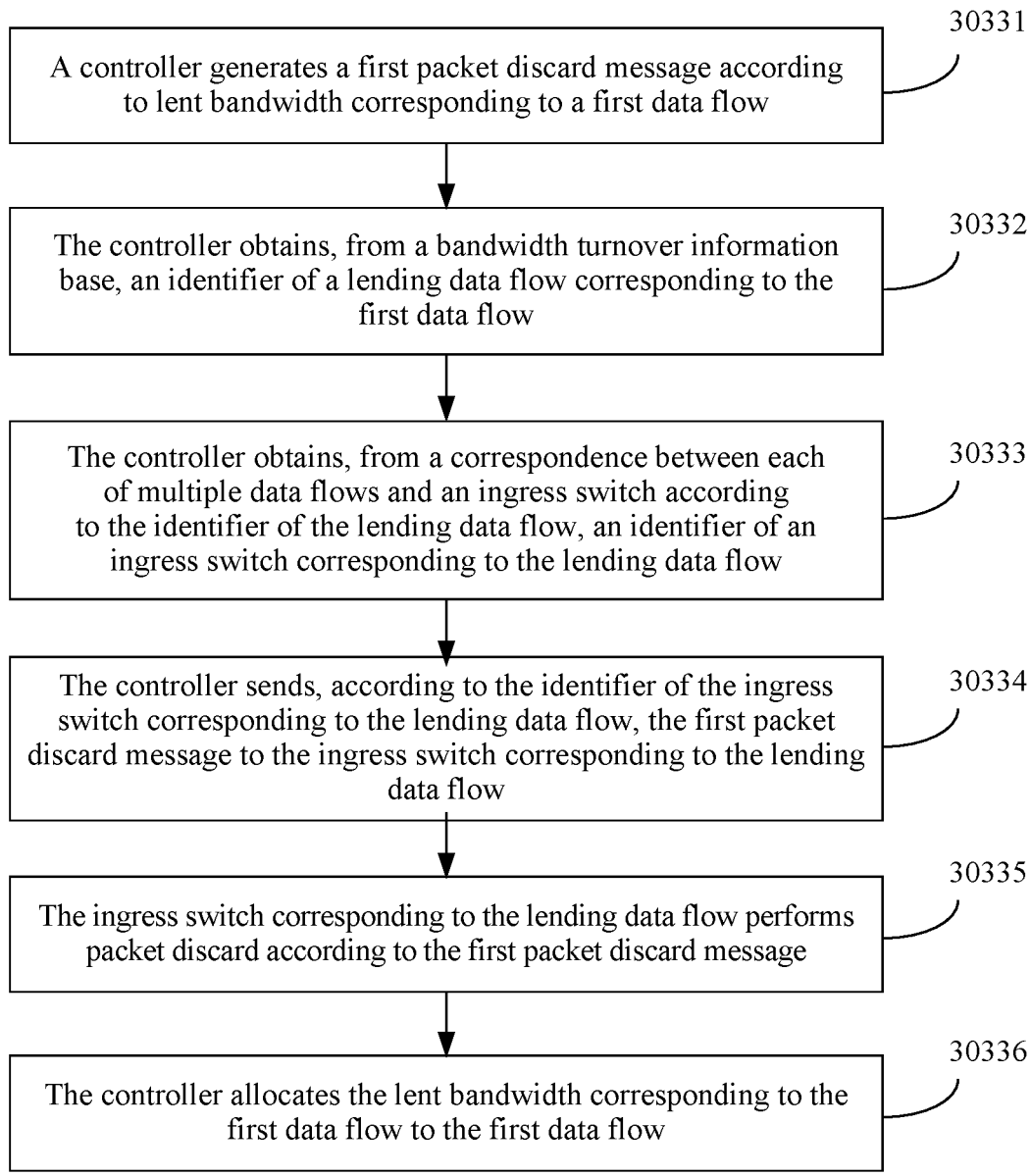
FIG. 5 is a flowchart of a lent bandwidth allocation method according to an embodiment of the present disclosure.

As shown in FIG. 5, step 3033 may include the following steps.

Step 30331: The controller generates a first packet discard message according to the lent bandwidth corresponding to the first data flow.

For example, the first packet discard message may include a packet discard instruction and the lent bandwidth corresponding to the first data flow. The packet discard instruction is used to instruct an ingress switch to perform packet discarding according to the first packet discard message.

Step 30332: The controller obtains, from the bandwidth turnover information base, an identifier of a lending data flow corresponding to the first data flow.

The controller may query, from the bandwidth turnover information base, the identifier of the lending data flow corresponding to the first data flow. It should be noted that there may be one or more lending data flows corresponding to the first data flow. Therefore, there may be one or more identifiers of the lending data flows corresponding to the first data flow.

Step 30333: The controller obtains, from a correspondence between each of the multiple data flows and an ingress switch according to the identifier of the lending data flow, an identifier of an ingress switch corresponding to the lending data flow.

Step 30334: The controller sends, according to the identifier of the ingress switch corresponding to the lending data flow, the first packet discard message to the ingress switch corresponding to the lending data flow.

Further, the controller may send, according to the identifier that is of the ingress switch corresponding to the lending data flow and that is obtained in step 30333, the first packet discard message generated in step 30331 to the ingress switch corresponding to the lending data flow.

Step 30335: The ingress switch corresponding to the lending data flow performs packet discarding according to the first packet discard message.

For example, if the ingress switch corresponding to the lending data flow is an ingress switch B2, the lent bandwidth corresponding to the first data flow is 10 Mbps. After the ingress switch B2 receives the first packet discard message, the ingress switch B2 may perform packet discarding on data flows of 10 Mbps on the ingress switch B2 according to the first packet discard message.

Step 30336: The controller allocates the lent bandwidth corresponding to the first data flow to the first data flow.

After the ingress switch corresponding to the lending data flow performs packet discarding according to the packet discard instruction and the lent bandwidth corresponding to the first data flow that are in the first packet discard message, the controller may allocate the lent bandwidth corresponding to the first data flow to the first data flow, and update, according to the lent bandwidth corresponding to the first data flow, a flow table corresponding to a data flow on the first ingress switch. Optionally, the controller may further update the shared bandwidth information tree, the bandwidth turnover information base, and the lendable bandwidth information base that are in the controller.

In one embodiment, after allocating the lent bandwidth corresponding to the first data flow to the first data flow, the controller may detect whether maximum bandwidth occupied by the first data flow after the bandwidth is allocated is less than the bandwidth required by the first data flow. If the maximum bandwidth occupied by the first data flow after the bandwidth is allocated is less than the bandwidth required by the first data flow, the controller performs step 3034 to allocate lendable bandwidth corresponding to other data flows other than the first data flow in the multiple data flows to the first data flow.

Step 3034: The controller obtains, from lendable bandwidth information base, lendable bandwidth corresponding to each of the multiple data flows.

For example, the controller may obtain, from the generated lendable bandwidth information base, the lendable bandwidth corresponding to each of the multiple data flows.

Step 3035: The controller determines, according to lendable bandwidth corresponding to other data flows other than the first data flow in the multiple data flows, whether there is lendable bandwidth on the other data flows. If there is lendable bandwidth on the other data flows, perform step 3036, or if there is no lendable bandwidth on the other data flows, perform step 3037.

The controller may obtain, according to the lendable bandwidth corresponding to the other data flows, the lendable bandwidth corresponding to the other data flows, and determine whether the lendable bandwidth corresponding to the other data flows is greater than zero. If the lendable bandwidth corresponding to the other data flows is greater than zero, there is lendable bandwidth on the other data flows, or if the lendable bandwidth corresponding to the other data flows is not greater than zero, there is no lendable bandwidth on the other data flows.

Step 3036: The controller allocates the lendable bandwidth to the first data flow.

Figure 6:
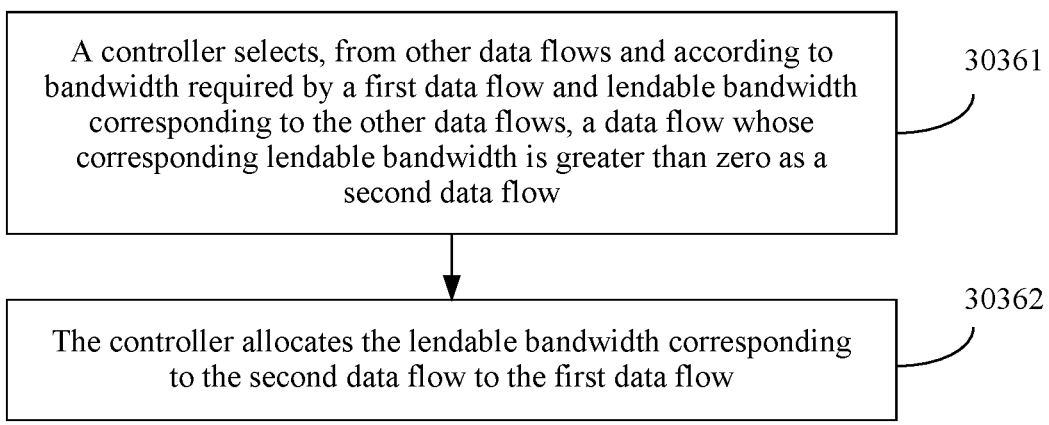
FIG. 6 is a flowchart of a lendable bandwidth allocation method according to an embodiment of the present disclosure.

As shown in FIG. 6, step 3036 may include the following steps.

Step 30361: The controller selects, from the other data flows and according to the bandwidth required by the first data flow and the lendable bandwidth corresponding to the other data flows, a data flow whose corresponding lendable bandwidth is greater than zero as a second data flow.

Further, if the bandwidth required by the first data flow is 30 Mbps, 30 Mbps bandwidth needs to be allocated to the first data flow. It is assumed that data flows that are in the other data flows other than the first data flow in the multiple data flows and whose corresponding lendable bandwidth is not zero are a data flow 1, a data flow 2, and a data flow 3.

If a sum of lendable bandwidth corresponding to the data flow 1, the data flow 2, and the data flow 3 is greater than the bandwidth required by the first data flow, data flows whose sum of corresponding lendable bandwidth is greater than or equal to the bandwidth required by the first data flow are selected from the data flow 1, the data flow 2, and the data flow 3 as the second data flow, or if a sum of lendable bandwidth corresponding to the data flow 1, the data flow 2, and the data flow 3 is equal to or less than a difference between the bandwidth required by the first data flow and the lendable bandwidth corresponding to the first data flow, each data flow whose corresponding lendable bandwidth is not zero is selected from the other data flows other than the first data flow in the multiple data flows as the second data flow, that is, the data flow 1, the data flow 2, and the data flow 3 are selected as the second data flow.

Step 30362: The controller allocates the lendable bandwidth corresponding to the second data flow to the first data flow.

For example, the controller may allocate, according to the lendable bandwidth corresponding to the second data flow, the lendable bandwidth corresponding to the second data flow to the first data flow, update a flow table corresponding to the first data flow and the second data flow, and send an updated flow table corresponding to the first data flow and the second data flow to the ingress switch corresponding to the first data flow and an ingress switch corresponding to the second data flow. Optionally, the controller may further update the shared bandwidth information tree, the bandwidth turnover information base, and the lendable bandwidth information base that are in the controller.

In one embodiment, after allocating the lendable bandwidth corresponding to the second data flow to the first data flow, the controller may detect whether maximum bandwidth occupied by the first data flow after the bandwidth is allocated is less than the bandwidth required by the first data flow. If the maximum bandwidth occupied by the first data flow after the bandwidth is allocated is less than the bandwidth required by the first data flow, the controller performs step 3037 to allocate bandwidth corresponding to a data flow that is in the multiple data flows and whose priority is lower than that of the first data flow to the first data flow.

Step 3037: The controller allocates bandwidth of a third data flow to the first data flow, where a priority of the third data flow is lower than a priority of the first data flow.

Figure 7:
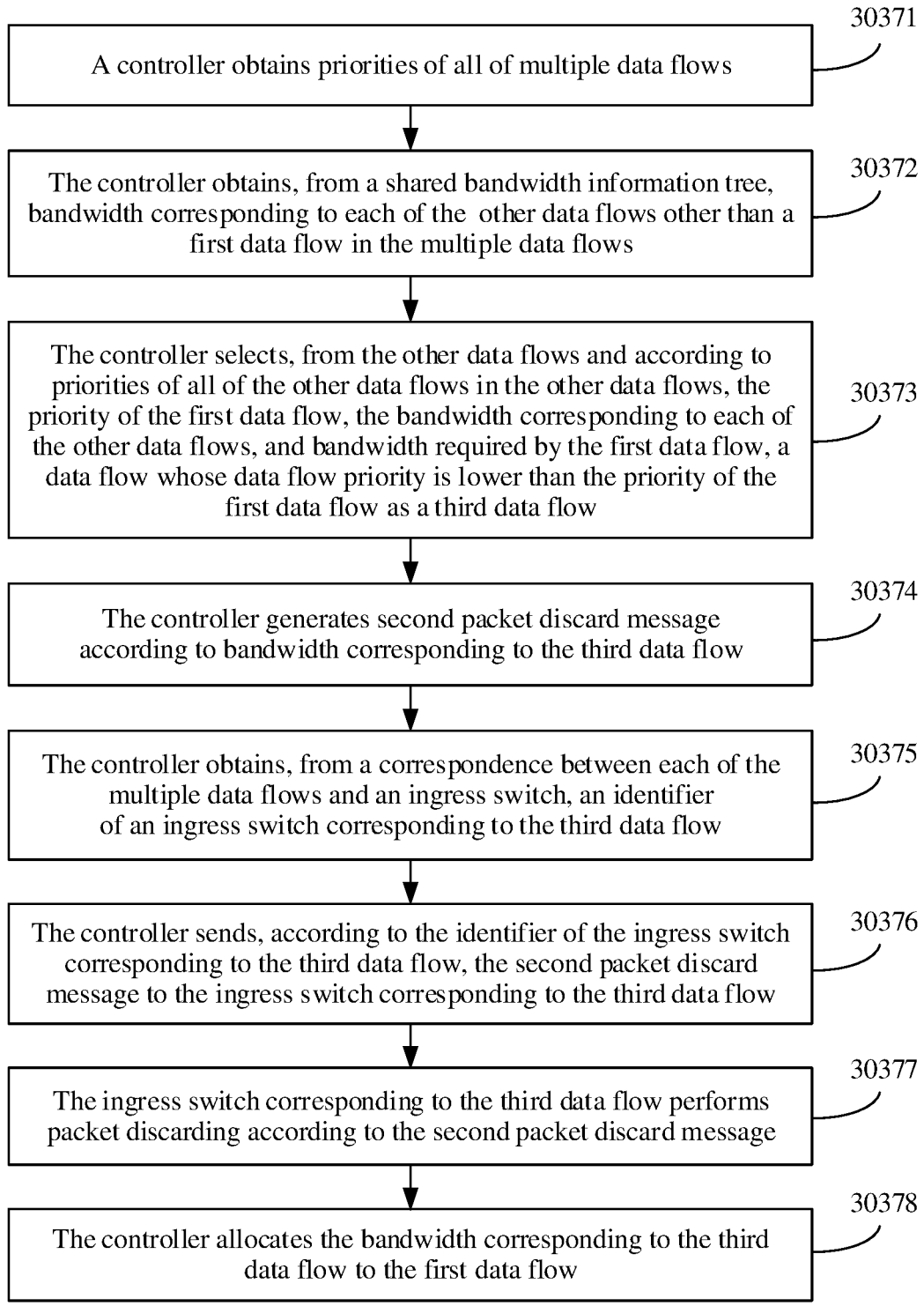
FIG. 7 is a flowchart of a method for allocating bandwidth of a ingress switch according to an embodiment of the present disclosure.

As shown in FIG. 7, step 3037 may include the following steps.

Step 30371: The controller obtains priorities of all of the multiple data flows.

It should be noted that the flow table corresponding to each of the multiple data flows generated by the controller may further include priority information corresponding to each of the multiple data flows. The controller may obtain, from the flow table corresponding to each of the multiple data flows, the priority information corresponding to each of the multiple data flows. The priority information of all of the multiple data flows may include priorities of all of the multiple data flows.

Step 30372: The controller obtains, from a shared bandwidth information tree, bandwidth corresponding to each of the other data flows other than the first data flow in the multiple data flows.

For example, because the shared bandwidth information tree records the bandwidth corresponding to each of the multiple data flows, the controller may obtain, from the shared bandwidth information tree, the bandwidth corresponding to each of the other data flows other than the first data flow in the multiple data flows.

Step 30373: The controller selects, from the other data flows and according to priorities of all the data flows in the other data flows, the priority of the first data flow, the bandwidth corresponding to each of the other data flows, and the bandwidth required by the first data flow, a data flow whose data flow priority is lower than the priority of the first data flow as the third data flow.

Further, if the bandwidth required by the first data flow is 30 Mbps, 30 Mbps bandwidth needs to be allocated to the first data flow. It is assumed that data flows that are in the other data flows other than the first data flow in the multiple data flows and whose priorities are lower than the priority of the first data flow are the data flow 1, the data flow 2, and the data flow 3.

If a sum of bandwidth corresponding to the data flow 1, the data flow 2, and the data flow 3 is greater than the bandwidth required by the first data flow, data flows whose sum of corresponding bandwidth is greater than or equal to the bandwidth required by the first data flow are selected from the data flow 1, the data flow 2, and the data flow 3 as the third data flow, or if a sum of bandwidth corresponding to the data flow 1, the data flow 2, and the data flow 3 is equal to or less than the bandwidth required by the first data flow, each of the other data flows other than the first data flow in the multiple data flows is selected as the third data flow, that is, the data flow 1, the data flow 2, and the data flow 3 are selected as the third data flow.

Step 30374: The controller generates second packet discard message according to bandwidth corresponding to the third data flow.

For example, the second packet discard message may include a packet discard instruction and the bandwidth corresponding to the third data flow. The packet discard instruction is used to instruct an ingress switch to perform packet discarding according to the second packet discard message.

Step 30375: The controller obtains, from the correspondence between each of the multiple data flows and an ingress switch, an identifier of an ingress switch corresponding to the third data flow.

Step 30376: The controller sends, according to the identifier of the ingress switch corresponding to the third data flow, the second packet discard message to the ingress switch corresponding to the third data flow.

Further, the controller may send the second packet discard message generated in step 30374 to the ingress switch corresponding to the third data flow.

Step 30377: The ingress switch corresponding to the third data flow performs packet discarding according to the second packet discard message.

For example, if the ingress switch corresponding to the third data flow is an ingress switch B3, the bandwidth corresponding to the third data flow is 10 Mbps. Therefore, after the ingress switch B3 receives the second packet discard message, the ingress switch B3 may perform packet discarding on data flows of 10 Mbps on the ingress switch B3 according to the second packet discard message such that 10 Mbps bandwidth on a data flow on the ingress switch B3 is in an idle state.

Step 30378: The controller allocates the bandwidth corresponding to the third data flow to the first data flow.

For example, the controller may allocate, according to the bandwidth corresponding to the third data flow, the bandwidth corresponding to the third data flow to the first data flow, update a flow table corresponding to the first data flow and the third data flow, and send an updated flow table corresponding to the first data flow and the third data flow to the ingress switches corresponding to the first data flow and the third data flow. Optionally, the controller may further update the shared bandwidth information tree, the bandwidth turnover information base, and the lendable bandwidth information base that are in the controller.

In one embodiment, after allocating the bandwidth corresponding to the third data flow to the first data flow, the controller may detect whether maximum bandwidth occupied by the first data flow after the bandwidth is allocated is less than the bandwidth required by the first data flow. If the maximum bandwidth occupied by the first data flow after the bandwidth is allocated is less than the bandwidth required by the first data flow, the controller performs packet discarding on the first data flow. In the prior art, the ingress switch corresponding to the first data flow forwards the first data flow to a primary switch, and the primary switch determines whether remaining bandwidth on the first data flow is less than the bandwidth required by the first data flow, and when the remaining bandwidth on the first data flow is less than the bandwidth required by the first data flow, performs packet discarding on the first data flow. Because the ingress switch corresponding to the first data flow forwards the first data flow to the primary switch, network resources are occupied. In the present disclosure, the controller directly performs determining, and performs corresponding processing according to a determining result such that the ingress switch corresponding to the first data flow does not need to forward the first data flow. Therefore, network resources are saved.

Step 304: The controller generates work instruction information.

Further, if a determining result in step 302 is that the bandwidth required by the first data flow is not greater than the preset bandwidth value, the controller may generate a forward message. The forward message is used to instruct a switch to forward the first data flow.

Step 305: The controller obtains, from the correspondence between each of the multiple data flows and an ingress switch, an identifier of an ingress switch corresponding to the first data flow.

Step 306: The controller sends, according to the identifier of the ingress switch corresponding to the first data flow, the work instruction information to the ingress switch corresponding to the first data flow.

The controller may send, according to the identifier of the first data flow, the work instruction information to the ingress switch corresponding to the first data flow.

Step 307: The ingress switch corresponding to the first data flow forwards the first data flow according to the work instruction information.

For example, the ingress switch corresponding to the first data flow may forward the first data flow to the primary switch, and the primary switch performs, according to information in the first data flow, corresponding processing on the first data flow.

It should be noted that a sequence of the steps of the network management method provided in this embodiment of the present disclosure may be adjusted properly, and a step may also be added or removed according to a situation. All modified methods that may be readily figured out by any person skilled in the art without departing from the technical scope disclosed in the present disclosure shall fall within the protection scope of the present disclosure. Therefore, details are not described.

In conclusion, according to the network management method provided in this embodiment of the present disclosure, a controller detects bandwidth required by a first data flow, determines whether the bandwidth required by the first data flow is greater than a preset bandwidth value, and when the bandwidth required by the first data flow is greater than the preset bandwidth value, allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 8:
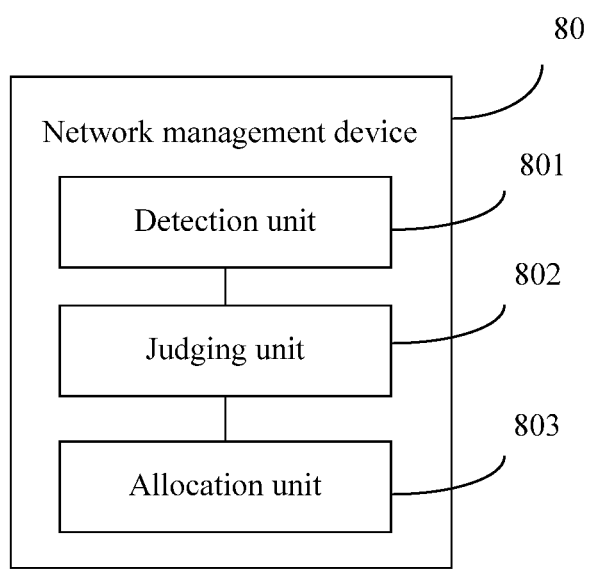
FIG. 8 is a schematic structural diagram of a network management device according to an embodiment of the present disclosure.

As shown in FIG. 8, an embodiment of the present disclosure provides a network management device 80. The network management device 80 may be a controller. The network management device 80 may include a detection unit 801 configured to detect bandwidth required by a first data flow, where the first data flow is any one of multiple data flows, a judging unit 802 configured to determine whether the bandwidth required by the first data flow is greater than a preset bandwidth value when the bandwidth required by the first data flow becomes higher, and an allocation unit 803 configured to allocate bandwidth to the first data flow if the bandwidth required by the first data flow is greater than the preset bandwidth value.

In conclusion, according to the network management device 80 provided in this embodiment of the present disclosure, a detection unit 801 detects bandwidth required by a first data flow, a judging unit 802 determines whether the bandwidth required by the first data flow is greater than a preset bandwidth value, and when the bandwidth required by the first data flow is greater than the preset bandwidth value, an allocation unit 803 allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 9:
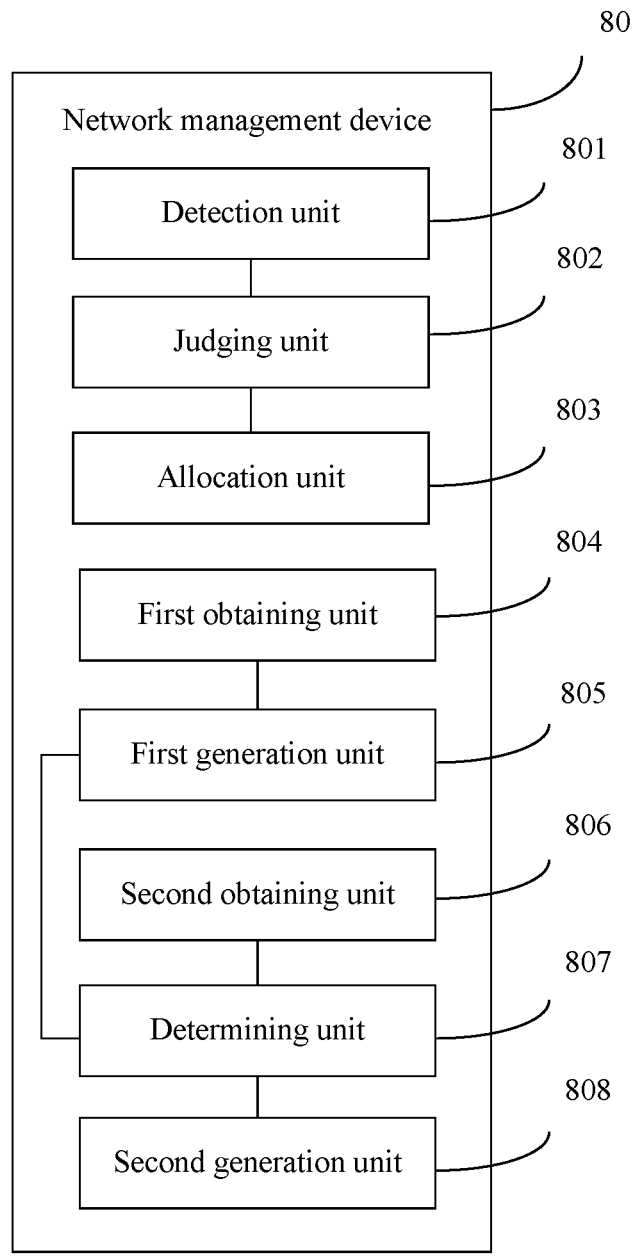
FIG. 9 is a schematic structural diagram of another network management device according to an embodiment of the present disclosure.

As shown in FIG. 9, an embodiment of the present disclosure provides another network management device 80. The network management device 80 may be a controller. The network management device 80 may include a detection unit 801 configured to detect bandwidth required by a first data flow, where the first data flow is any one of multiple data flows, a judging unit 802 configured to determine whether the bandwidth required by the first data flow is greater than a preset bandwidth value when the bandwidth required by the first data flow becomes higher, an allocation unit 803 configured to allocate bandwidth to the first data flow if the bandwidth required by the first data flow is greater than the preset bandwidth value, a first obtaining unit 804 configured to obtain network QoS configuration information in the network management system, a first generation unit 805 configured to separately generate a shared bandwidth information tree, a bandwidth turnover information base, a flow table corresponding to each of the multiple data flows, and a correspondence between each of the multiple data flows and an ingress switch according to the QoS configuration information, where the shared bandwidth information tree records bandwidth corresponding to each of the multiple data flows, the bandwidth turnover information base records lent bandwidth corresponding to each of the multiple data flows and an identifier of a lending data flow, and borrowed bandwidth corresponding to each of the multiple data flows and an identifier of a borrowing data flow, and the flow table is used to indicate maximum bandwidth occupied by each of the multiple data flows, a second obtaining unit 806 configured to obtain bandwidth occupied by each of the multiple data flows, a determining unit 807 configured to determine, according to the bandwidth occupied by each of the multiple data flows and the flow table corresponding to each of the multiple data flows, lendable bandwidth corresponding to each of the multiple data flows, and a second generation unit 808 configured to generate a lendable bandwidth information base according to the lendable bandwidth corresponding to each of the multiple data flows, where the lendable bandwidth information base records the lendable bandwidth corresponding to each of the multiple data flows.

In conclusion, according to the network management device 80 provided in this embodiment of the present disclosure, a detection unit 801 detects bandwidth required by a first data flow, a judging unit 802 determines whether the bandwidth required by the first data flow is greater than a preset bandwidth value, and when the bandwidth required by the first data flow is greater than the preset bandwidth value, an allocation unit 803 allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 10:
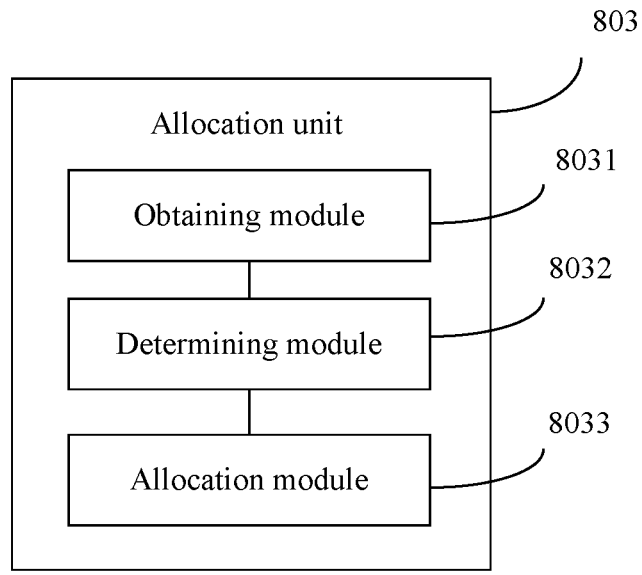
FIG. 10 is a schematic structural diagram of an allocation unit according to an embodiment of the present disclosure.

As shown in FIG. 10, the allocation unit 803 may include an obtaining module 8031 configured to obtain, from the bandwidth turnover information base, lent bandwidth corresponding to the first data flow, a determining module 8032 configured to determine whether there is lent bandwidth on the first data flow according to the lent bandwidth corresponding to the first data flow, and an allocation module 8033 configured to allocate bandwidth to the first data flow according to a determining result of the lent bandwidth.

Figure 11:
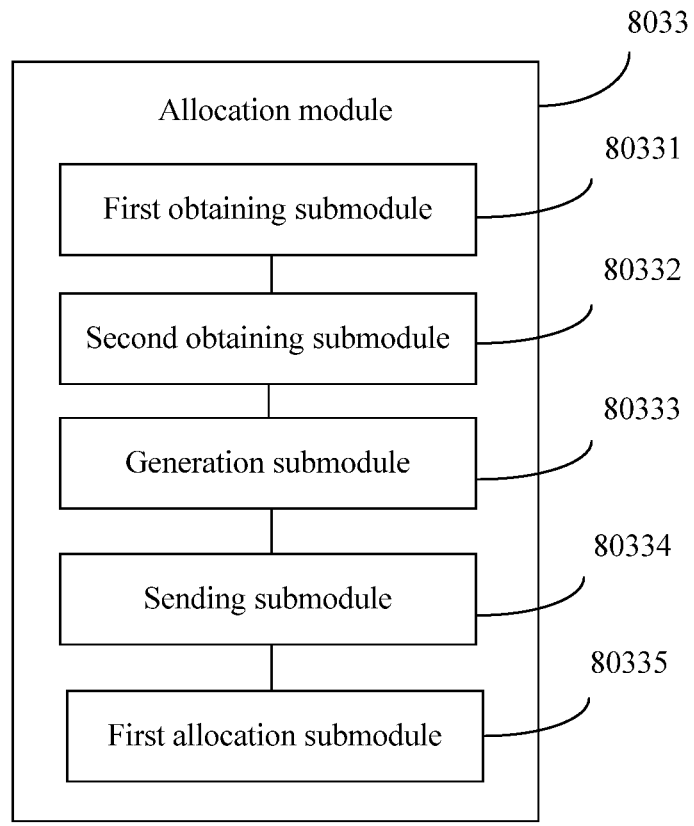
FIG. 11 is a schematic structural diagram of an allocation module according to an embodiment of the present disclosure.

According to an embodiment, as shown in FIG. 11, the allocation module 8033 may include a first obtaining submodule 80331 configured to obtain, from the bandwidth turnover information base, an identifier of a lending data flow corresponding to the first data flow if there is lent bandwidth on the first data flow, a second obtaining submodule 80332 configured to obtain, according to the correspondence between each of the multiple data flows and an ingress switch, an identifier of an ingress switch corresponding to the lending data flow, a generation submodule 80333 configured to generate a first packet discard message according to the lent bandwidth corresponding to the first data flow, a sending submodule 80334 configured to send, according to the identifier of the ingress switch corresponding to the lending data flow, the first packet discard message to the ingress switch corresponding to the lending data flow such that the ingress switch corresponding to the lending data flow performs packet discarding according to the first packet discard message, and a first allocation submodule 80335 configured to allocate the lent bandwidth to the first data flow.

Figure 12:
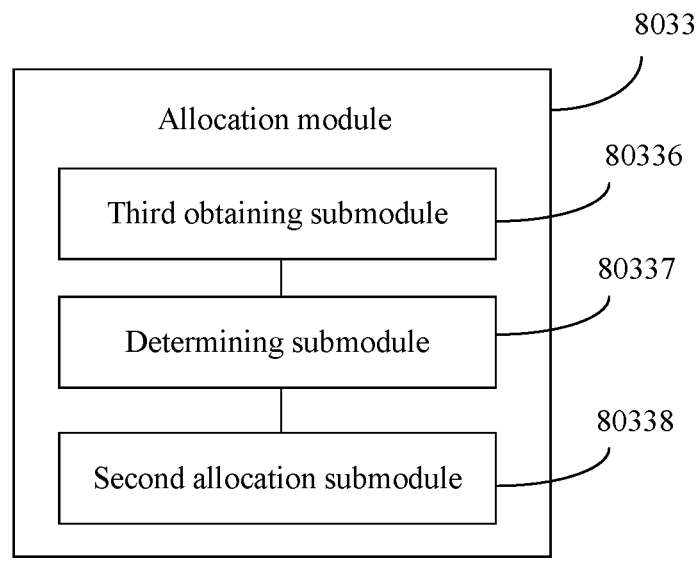
FIG. 12 is a schematic structural diagram of another allocation module according to an embodiment of the present disclosure.

According to another embodiment, as shown in FIG. 12, the allocation module 8033 may include a third obtaining submodule 80336 configured to obtain, from the lendable bandwidth information base, the lendable bandwidth corresponding to each of the multiple data flows if there is no lent bandwidth on the first data flow, a determining submodule 80337 configured to determine, according to lendable bandwidth corresponding to other data flows other than the first data flow in the multiple data flows, whether there is lendable bandwidth on the other data flows, and a second allocation submodule 80338 configured to allocate bandwidth to the first data flow according to a determining result of the lendable bandwidth.

According to an aspect, the second allocation submodule 80338 is further configured to select, from the other data flows and according to the bandwidth required by the first data flow and the lendable bandwidth corresponding to the other data flows, a data flow whose corresponding lendable bandwidth is greater than zero as a second data flow if there is lendable bandwidth on the other data flows, and allocate the lendable bandwidth corresponding to the second data flow to the first data flow.

According to another aspect, the second allocation submodule 80338 is further configured to obtain priorities of all of the multiple data flows if there is no lendable bandwidth on the other data flows, obtain, from the shared bandwidth information tree, bandwidth corresponding to the other data flows, select, from the other data flows and according to a priority of the first data flow, priorities of the other data flows, the bandwidth corresponding to the other data flows, and bandwidth required by a data flow on the first ingress switch, a data flow whose priority is lower than the priority of the first data flow as a third data flow, and obtain, according to the correspondence between each of the multiple data flows and an ingress switch, an identifier of an ingress switch corresponding to the third data flow, generate second packet discard message according to bandwidth corresponding to the third data flow, send, according to the identifier of the ingress switch corresponding to the third data flow, the second packet discard message to the ingress switch corresponding to the third data flow such that the ingress switch corresponding to the third data flow performs packet discarding according to the second packet discard message, and allocate bandwidth corresponding to the third data flow to the first data flow.

In conclusion, according to the network management device 80 provided in this embodiment of the present disclosure, a detection unit 801 detects bandwidth required by a first data flow, a judging unit 802 determines whether the bandwidth required by the first data flow is greater than a preset bandwidth value, and when the bandwidth required by the first data flow is greater than the preset bandwidth value, an allocation unit 803 allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 13:
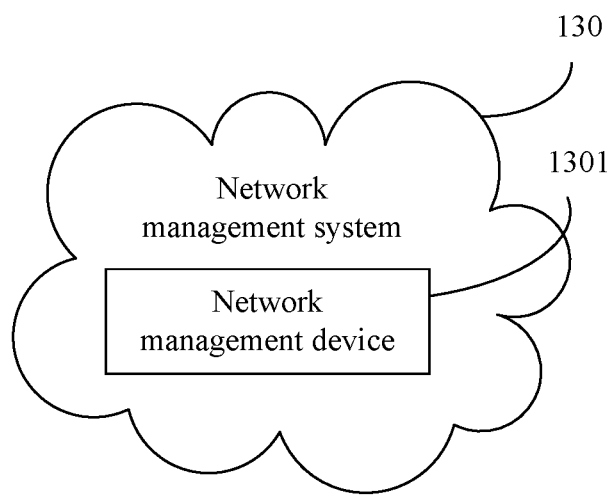
FIG. 13 is a schematic diagram of an architecture of a network management system according to an embodiment of the present disclosure.

As shown in FIG. 13, an embodiment of the present disclosure provides a network management system 130. The network management system 130 may include a network management device 1301. The network management device 1301 may be the network management device 80 shown in FIG. 8 or FIG. 9.

In conclusion, according to the network management system 130 provided in this embodiment of the present disclosure, a controller detects bandwidth required by a first data flow, determines whether the bandwidth required by the first data flow is greater than a preset bandwidth value, and when the bandwidth required by the first data flow is greater than the preset bandwidth value, allocates bandwidth to the first data flow. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 14:
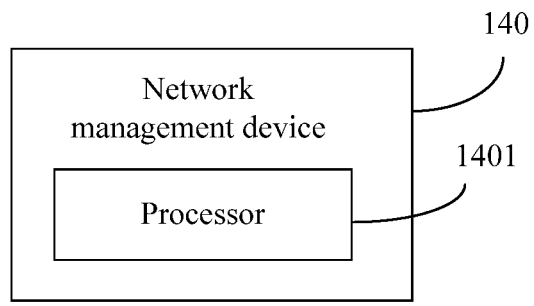
FIG. 14 is a schematic structural diagram of still another network management device according to an embodiment of the present disclosure.

As shown in FIG. 14, an embodiment of the present disclosure provides still another network management device 140. The network management device 140 may be a controller. The network management device 140 may include a processor 1401 configured to detect bandwidth required by a first data flow, where the first data flow is any one of multiple data flows.

The processor 1401 is further configured to determine whether the bandwidth required by the first data flow is greater than a preset bandwidth value when the bandwidth required by the first data flow becomes higher.

The processor 1401 is further configured to allocate bandwidth to the first data flow if the bandwidth required by the first data flow is greater than the preset bandwidth value.

In conclusion, according to the network management device 140 provided in this embodiment of the present disclosure, the processor 1401 detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 15:
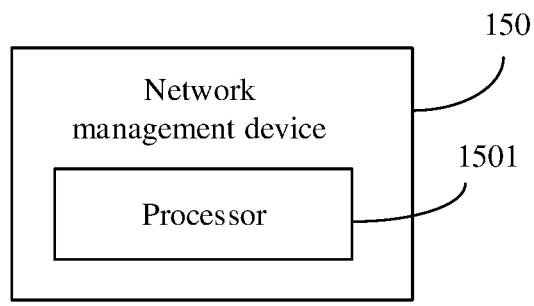
FIG. 15 is a schematic structural diagram of yet another network management device according to an embodiment of the present disclosure.

As shown in FIG. 15, an embodiment of the present disclosure provides yet another network management device 150. The network management device 150 may be a controller. The network management device 150 may include a processor 1501 configured to detect bandwidth required by a first data flow, where the first data flow is any one of multiple data flows.

The processor 1501 is further configured to determine whether the bandwidth required by the first data flow is greater than a preset bandwidth value when the bandwidth required by the first data flow becomes higher.

The processor 1501 is further configured to allocate bandwidth to the first data flow if the bandwidth required by the first data flow is greater than the preset bandwidth value.

The processor 1501 is further configured to obtain network QoS configuration information in the network management system.

The processor 1501 is further configured to separately generate a shared bandwidth information tree, a bandwidth turnover information base, a flow table corresponding to each of the multiple data flows, and a correspondence between each of the multiple data flows and an ingress switch according to the QoS configuration information, where the shared bandwidth information tree records bandwidth corresponding to each of the multiple data flows, the bandwidth turnover information base records lent bandwidth corresponding to each of the multiple data flows and an identifier of a lending data flow, and borrowed bandwidth corresponding to each of the multiple data flows and an identifier of a borrowing data flow, and the flow table is used to indicate maximum bandwidth occupied by each of the multiple data flows.

The processor 1501 is further configured to obtain bandwidth occupied by each of the multiple data flows.

The processor 1501 is further configured to determine, according to the bandwidth occupied by each of the multiple data flows and the flow table corresponding to each of the multiple data flows, lendable bandwidth corresponding to each of the multiple data flows.

The processor 1501 is further configured to generate a lendable bandwidth information base according to the lendable bandwidth corresponding to each of the multiple data flows, where the lendable bandwidth information base records the lendable bandwidth corresponding to each of the multiple data flows.

In conclusion, according to the network management device 150 provided in this embodiment of the present disclosure, the processor 1501 detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

The processor 1501 is further configured to obtain, from the bandwidth turnover information base, lent bandwidth corresponding to the first data flow.

The processor 1501 is further configured to determine whether there is lent bandwidth on the first data flow according to the lent bandwidth corresponding to the first data flow.

The processor 1501 is further configured to allocate bandwidth to the first data flow according to a determining result of the lent bandwidth.

The processor 1501 is further configured to obtain, from the bandwidth turnover information base, an identifier of a lending data flow corresponding to the first data flow if there is lent bandwidth on the first data flow.

The processor 1501 is further configured to obtain, according to the correspondence between each of the multiple data flows and an ingress switch, an identifier of an ingress switch corresponding to the lending data flow.

The processor 1501 is further configured to generate a first packet discard message according to the lent bandwidth corresponding to the first data flow.

The processor 1501 is further configured to send, according to the identifier of the ingress switch corresponding to the lending data flow, the first packet discard message to the ingress switch corresponding to the lending data flow such that the ingress switch corresponding to the lending data flow performs packet discarding according to the first packet discard message.

The processor 1501 is further configured to allocate the lent bandwidth to the first data flow.

The processor 1501 is further configured to obtain, from the lendable bandwidth information base, the lendable bandwidth corresponding to each of the multiple data flows if there is no lent bandwidth on the first data flow.

The processor 1501 is further configured to determine, according to lendable bandwidth corresponding to other data flows other than the first data flow in the multiple data flows, whether there is lendable bandwidth on the other data flows.

The processor 1501 is further configured to allocate bandwidth to the first data flow according to a determining result of the lendable bandwidth.

The processor 1501 is further configured to select, from the other data flows and according to the bandwidth required by the first data flow and the lendable bandwidth corresponding to the other data flows, a data flow whose corresponding lendable bandwidth is greater than zero as a second data flow if there is lendable bandwidth on the other data flows, and allocate the lendable bandwidth corresponding to the second data flow to the first data flow.

The processor 1501 is further configured to obtain priorities of all of the multiple data flows if there is no lendable bandwidth on the other data flows, obtain, from the shared bandwidth information tree, bandwidth corresponding to the other data flows, select, from the other data flows and according to a priority of the first data flow, priorities of the other data flows, the bandwidth corresponding to the other data flows, and bandwidth required by a data flow on the first ingress switch, a data flow whose priority is lower than the priority of the first data flow as a third data flow, obtain, according to the correspondence between each of the multiple data flows and an ingress switch, an identifier of an ingress switch corresponding to the third data flow, generate second packet discard message according to bandwidth corresponding to the third data flow, send, according to the identifier of the ingress switch corresponding to the third data flow, the second packet discard message to the ingress switch corresponding to the third data flow such that the ingress switch corresponding to the third data flow performs packet discarding according to the second packet discard message, and allocate bandwidth corresponding to the third data flow to the first data flow.

In conclusion, according to the network management device 150 provided in this embodiment of the present disclosure, the processor 1501 detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

Figure 16:
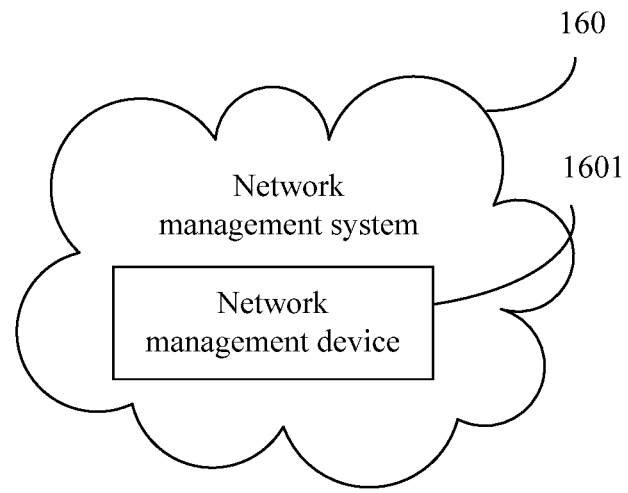
FIG. 16 is a schematic diagram of an architecture of another network management system according to an embodiment of the present disclosure.

As shown in FIG. 16, an embodiment of the present disclosure provides another network management system 160. The network management system 160 may include a network management device 1601. The network management device 1601 may be the network management device 140 shown in FIG. 14 or the network management device 150 shown in FIG. 15.

In conclusion, according to the network management system 160 provided in this embodiment of the present disclosure, a network management device 140, 150 detects bandwidth required by a first data flow, determines whether the bandwidth required by the first data flow is greater than a preset bandwidth value, and allocates bandwidth to the first data flow when the bandwidth required by the first data flow is greater than the preset bandwidth value. In this process, the controller can directly detect the bandwidth required by the first data flow and allocate bandwidth to the first data flow according to a detection result such that a primary switch does not need to generate a bandwidth request message to trigger the controller to allocate bandwidth to the first data flow, thereby reducing time consumed in performing network management by the controller, and improving efficiency of performing network management by the controller.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A network management method implemented by a controller in a network management system, wherein the network management method comprises:

detecting bandwidth required by a first data flow, wherein the first data flow is one of a plurality of data flows, wherein the network management system comprises a primary switch and a plurality of ingress switches, and wherein each ingress switch of the plurality of ingress switches receives one or more of the data flows;

obtaining a lendable bandwidth corresponding to each of the data flows from a bandwidth turnover information base, wherein the first data flow does not comprise a lent bandwidth;

determining whether a second data flow of the data flows other than the first data flow comprises lendable bandwidth in response to obtaining the lendable bandwidth corresponding to each of the data flows; and allocating bandwidth to the first data flow based on the bandwidth required by the first data flow being greater than a preset bandwidth value, and wherein the second data flow of the data flows comprises the lendable bandwidth.

2. The network management method of claim 1, wherein further comprises:

obtaining network quality of service (QoS) configuration information in the network management system;

generating a shared bandwidth information tree to record bandwidth corresponding to each of the data flows;

generating a bandwidth turnover information base to record the lent bandwidth corresponding to each of the data flows and an identifier of a lending data flow;

generating borrowed bandwidth corresponding to each of the data flows and an identifier of a borrowing data flow;

generating a flow table corresponding to each of the data flows, wherein the flow table indicates maximum bandwidth occupied by each of the data flows; and generating a correspondence between each of the data flows and the ingress switch according to the QoS configuration information;

obtaining bandwidth occupied by each of the data flows;

determining, according to the bandwidth occupied by each of the data flows and the flow table corresponding to each of the data flows, lendable bandwidth corresponding to each of the data flows; and generating a lendable bandwidth information base according to the lendable bandwidth corresponding to each of the data flows, wherein the lendable bandwidth information base records the lendable bandwidth corresponding to each of the data flows.

3. The network management method of claim 2, wherein allocating the bandwidth to the first data flow comprises:

determining whether the first data flow comprises the lent bandwidth according to the lent bandwidth corresponding to each of the data flows; and allocating the bandwidth to the first data flow based on determining the first data flow comprises the lent bandwidth.

4. The network management method of claim 3, wherein allocating the bandwidth to the first data flow based on determining the first data flow comprises the lent bandwidth comprises:

obtaining, from the bandwidth turnover information base, the identifier of the lending data flow when the first data flow comprises the lent bandwidth;

obtaining, according to the correspondence between each of the data flows and the ingress switch, an identifier of an ingress switch corresponding to the lending data flow;

generating a first packet discard message according to the lent bandwidth corresponding to the first data flow;

sending, according to the identifier of the ingress switch corresponding to the lending data flow, the first packet discard message to the ingress switch corresponding to the lending data flow to permit the ingress switch corresponding to the lending data flow to perform packet discarding according to the first packet discard message; and allocating the lent bandwidth to the first data flow.

5. The network management method of claim 3, wherein allocating the bandwidth to the first data flow comprises:

selecting, from other data flows other than the first data flow and according to the bandwidth required by the first data flow and the lendable bandwidth corresponding to the other data flows, a data flow whose corresponding lendable bandwidth is greater than zero as a second data flow when the other data flows comprises the lendable bandwidth; and allocating the lendable bandwidth corresponding to the second data flow to the first data flow.

6. The network management method of claim 3, wherein allocating the bandwidth to the first data flow comprises:

obtaining priorities of the data flows when the other data flows do not comprise the lendable bandwidth;

obtaining, from the shared bandwidth information tree, bandwidth corresponding to the other data flows;

selecting, from other data flows other than the first data flow and according to a priority of the first data flow, priorities of the other data flows, the bandwidth corresponding to the other data flows, and bandwidth required by a data flow on a first ingress switch, a data flow whose priority is lower than the priority of the first data flow to obtain a third data flow;

obtaining, according to the correspondence between each of the data flows and the ingress switch, an identifier of an ingress switch corresponding to the third data flow;

generating a second packet discard message according to bandwidth corresponding to the third data flow;

sending, according to the identifier of the ingress switch corresponding to the third data flow, the second packet discard message to the ingress switch corresponding to the third data flow to permit the ingress switch corresponding to the third data flow to perform packet discarding according to the second packet discard message; and allocating the bandwidth corresponding to the third data flow to the first data flow.

7. A network management apparatus, comprising:

a non-transitory computer readable medium comprising instructions; and a processor coupled to the non-transitory computer readable medium, wherein the instructions cause the processor to be configured to:

detect bandwidth required by a first data flow, wherein the first data flow is one of a data flows received at an ingress switch of a plurality of ingress switches;

obtain a lendable bandwidth corresponding to each of the data flows from a bandwidth turnover information base, wherein the first data flow does not comprise a lent bandwidth;

determine whether a second data flow of the data flows other than the first data flow comprises lendable bandwidth in response to obtaining the lendable bandwidth corresponding to each of the data flows; and allocate bandwidth to the first data flow based on the bandwidth required by the first data flow being greater than a preset bandwidth value, and wherein the second data flow of the data flows comprises the lendable bandwidth.

8. The network management apparatus of claim 7, wherein the instructions further cause the processor to be configured to:
- obtain network quality of service (QoS) configuration information in a network management system;
- generate a shared bandwidth information tree to record bandwidth corresponding to each of the data flows;
- generate a bandwidth turnover information base to record the lent bandwidth corresponding to each of the data flows and an identifier of a lending data flow;
- generate a flow table corresponding to each of the data flows, wherein the flow table indicates maximum bandwidth occupied by each of the data flows; and
- generate a correspondence between each of the data flows and the ingress switch according to the QoS configuration information;
- obtain bandwidth occupied by each of the data flows;
- determine, according to the bandwidth occupied by each of the data flows and the flow table corresponding to each of the data flows, lendable bandwidth corresponding to each of the data flows; and
- generate a lendable bandwidth information base according to the lendable bandwidth corresponding to each of the data flows, wherein the lendable bandwidth information base records the lendable bandwidth corresponding to each of the data flows.

9. The network management apparatus of claim 8, wherein the instructions further cause the processor to be configured to:
- determine whether the first data flow comprises the lent bandwidth according to the lent bandwidth corresponding to each of the data flows; and
- allocate the bandwidth to the first data flow according to determining the first data flow comprises the lent bandwidth.

10. The network management apparatus of claim 9, wherein the instructions further cause the processor to be configured to:
- obtain, from the bandwidth turnover information base, the identifier of the lending data flow when the first data flow comprises the lent bandwidth;
- obtain, according to the correspondence between each of the data flows and the ingress switch, an identifier of an ingress switch corresponding to the lending data flow;
- generate a first packet discard message according to the lent bandwidth corresponding to the first data flow;
- send, according to the identifier of the ingress switch corresponding to the lending data flow, the first packet discard message to the ingress switch corresponding to the lending data flow to permit the ingress switch corresponding to the lending data flow to perform packet discarding according to the first packet discard message; and allocate the lent bandwidth to the first data flow.

11. The network management apparatus of claim 9, wherein the instructions further cause the processor to be configured to:
- select, from other data flows other than the first data flow and according to the bandwidth required by the first data flow and the lendable bandwidth corresponding to the other data flows, a data flow whose corresponding lendable bandwidth is greater than zero as a second data flow when the other data flows comprises the lendable bandwidth; and
- allocate the lendable bandwidth corresponding to the second data flow to the first data flow.

12. The network management apparatus of claim 9, wherein the instructions further cause the processor to be configured to:
- obtain priorities of the data flows when the other data flows do not comprise the lendable bandwidth;
- obtain, from the shared bandwidth information tree, bandwidth corresponding to the other data flows;
- select, from other data flows other than the first data flow and according to a priority of the first data flow, priorities of the other data flows, the bandwidth corresponding to the other data flows, and bandwidth required by a data flow on a first ingress switch, a data flow whose priority is lower than the priority of the first data flow to obtain a third data flow;
- obtain, according to the correspondence between each of the data flows and the ingress switch, an identifier of an ingress switch corresponding to the third data flow;
- generate a second packet discard message according to bandwidth corresponding to the third data flow;
- send, according to the identifier of the ingress switch corresponding to the third data flow, the second packet discard message to the ingress switch corresponding to the third data flow to permit the ingress switch corresponding to the third data flow to perform packet discarding according to the second packet discard message; and
- allocate the bandwidth corresponding to the third data flow to the first data flow.

13. A non-transitory computer readable medium comprising instructions, which when executed by a processor coupled to the non-transitory computer readable medium, causes the processor to be configured to:
- detect bandwidth required by a first data flow, wherein the first data flow is one of a data flows at an ingress switch of a plurality of ingress switches, and wherein each ingress switch of the plurality of ingress switches receives one or more of the data flows; and
- obtain a lendable bandwidth corresponding to each of the data flows from a bandwidth turnover information base, wherein the first data flow does not comprise a lent bandwidth;
- determine whether a second data flow of the data flows other than the first data flow comprises lendable bandwidth in response to obtaining the lendable bandwidth corresponding to each of the data flows; and
- allocate bandwidth to the first data flow based on the bandwidth required by the first data flow is greater than a preset bandwidth value, and wherein the second data flow of the data flows comprises the lendable bandwidth.

14. The non-transitory computer readable medium of claim 13, wherein the instructions further cause the processor to be configured to:
- obtain network quality of service (QoS) configuration information;
- generate a shared bandwidth information tree to record bandwidth corresponding to each of the data flows;
- generate a bandwidth turnover information base to record the lent bandwidth corresponding to each of the data flows and an identifier of a lending data flow;
- generate borrowed bandwidth corresponding to each of the data flows and an identifier of a borrowing data flow;
- generate a flow table corresponding to each of the data flows, wherein the flow table indicates maximum bandwidth occupied by each of the data flows; and generate a correspondence between each of the data flows and an ingress switch according to the QoS configuration information;

obtain bandwidth occupied by each of the data flows;

determine, according to the bandwidth occupied by each of the data flows and the flow table corresponding to each of the data flows, lendable bandwidth corresponding to each of the data flows; and generate a lendable bandwidth information base according to the lendable bandwidth corresponding to each of the data flows, wherein the lendable bandwidth information base records the lendable bandwidth corresponding to each of the data flows.

15. The non-transitory computer readable medium of claim 14, wherein the instructions further cause the processor to be configured to:

determine whether the first data flow comprises the lent bandwidth according to the lent bandwidth corresponding to each of the data flows; and allocate the bandwidth to the first data flow according to determining the first data flow comprises the lent bandwidth.

16. The non-transitory computer readable medium of claim 15, wherein the instructions further cause the processor to be configured to:

obtain, from the bandwidth turnover information base, the identifier of the lending data flow when the first data flow comprises the first lent bandwidth;

obtain, according to the correspondence between each of the data flows and the ingress switch, an identifier of an ingress switch corresponding to the lending data flow;

generate a first packet discard message according to the lent bandwidth corresponding to the first data flow;

send, according to the identifier of the ingress switch corresponding to the lending data flow, the first packet discard message to the ingress switch corresponding to the lending data flow such that the ingress switch corresponding to the lending data flow performs packet discarding according to the first packet discard message; and allocate the first lent bandwidth to the first data flow.

17. The non-transitory computer readable medium of claim 15, wherein the instructions to allocate the bandwidth to the first data flow according to determining the first data flow comprises the lendable bandwidth further comprises instructions to cause the processor to be configured to:

select, from other data flows other than the first data flow and according to the bandwidth required by the first data flow and the lendable bandwidth corresponding to the other data flows, a data flow whose corresponding lendable bandwidth is greater than zero as a second data flow when there the other data flows comprises the lendable bandwidth; and allocate the lendable bandwidth corresponding to the second data flow to the first data flow.

18. The non-transitory computer readable medium of claim 15, wherein the instructions to allocate the bandwidth to the first data flow according to determining the first data flow comprises the lendable bandwidth further comprises instructions to cause the processor to be configured to:

obtain priorities of the data flows when the other data flows does not comprise the lendable bandwidth;

obtain, from the shared bandwidth information tree, bandwidth corresponding to the other data flows;

select, from other data flows other than the first data flow and according to a priority of the first data flow, priorities of the other data flows, the bandwidth corresponding to the other data flows, and bandwidth required by a data flow on a first ingress switch, a data flow whose priority is lower than the priority of the first data flow to obtain a third data flow;

obtain, according to the correspondence between each of the data flows and the ingress switch, an identifier of an ingress switch corresponding to the third data flow;

generate a second packet discard message according to bandwidth corresponding to the third data flow;

send, according to the identifier of the ingress switch corresponding to the third data flow, the second packet discard message to the ingress switch corresponding to the third data flow to permit the ingress switch corresponding to the third data flow to perform packet discarding according to the second packet discard message; and allocate the bandwidth corresponding to the third data flow to the first data flow.

\* \* \* \* \*

UNITED STATES PATENT AND TRADEMARK OFFICE
CERTIFICATE OF CORRECTION

PATENT NO. : 10,476,746 B2
APPLICATION NO. : 15/661811
DATED : November 12, 2019
INVENTOR(S) : Ren Zhu and Wei Zhou Page 1 of 1

It is certified that error appears in the above-identified patent and that said Letters Patent is hereby corrected as shown below:

On the Title Page

Item (73) Assignee should read:
HUAWEI TECHNOLOGIES CO., LTD., Shenzhen (CN)

In the Claims

Claim 7, Column 24, Line 52: "of a data flows" should read "of a plurality of data flows"

Claim 13, Column 26, Line 35: "of a data flows" should read "of a plurality of data flows"

Signed and Sealed this
Twenty-fourth Day of December, 2019

Andrei Iancu
*Director of the United States Patent and Trademark Office*